No. 797,744. PATENTED AUG. 22, 1905.
H. W. O'DOWD.
FLUID HEATER.
APPLICATION FILED JAN. 24, 1905.
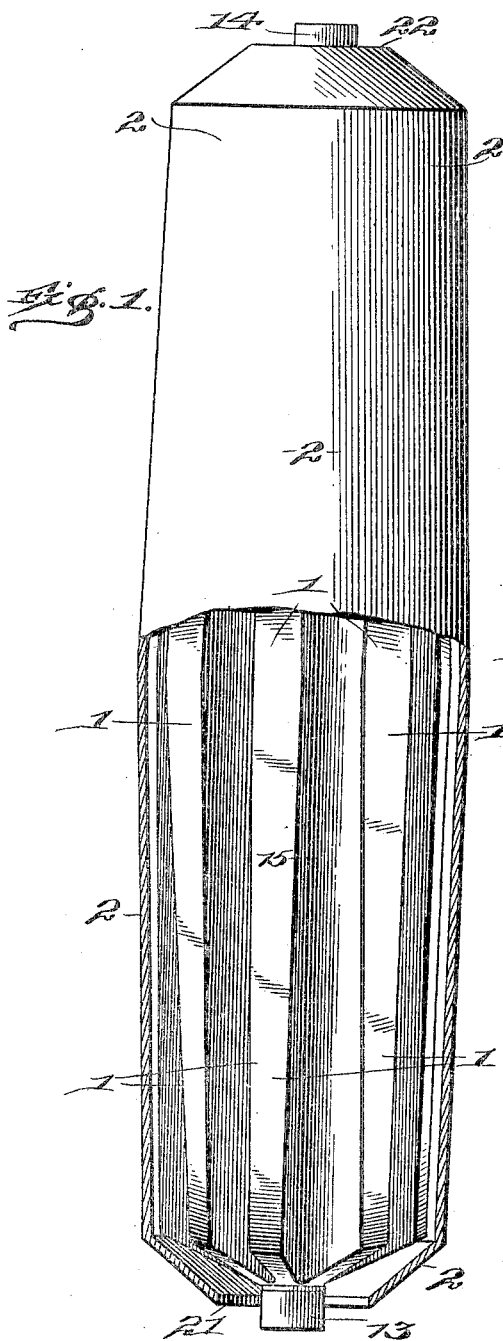
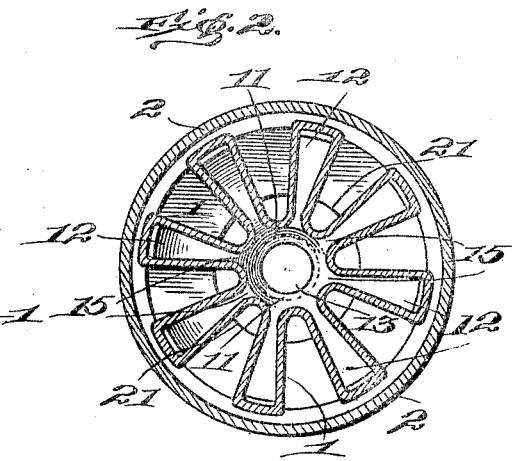
Attest:
C. Mitchell
R. W. Ashley
Inventor:
Henry W. O'Dowd
by Dickerson, Brown, Raegener & Binney
Attys.

UNITED STATES PATENT OFFICE.

HENRY W. O'DOWD, OF PEEKSKILL, NEW YORK, ASSIGNOR OF ONE-HALF TO ALEXANDER T. S. CLARKE, OF PEEKSKILL, NEW YORK.

FLUID-HEATER.

No. 797,744.          Specification of Letters Patent.          Patented Aug. 22, 1905.

Application filed January 24, 1905. Serial No. 242,513.

*To all whom it may concern:*

Be it known that I, HENRY W. O'DOWD, a citizen of the United States, and a resident of Peekskill, in the county of Westchester and State of New York, have invented certain new and useful Improvements in Fluid-Heaters, of which the following is a specification.

My invention relates to a device for transferring heat through the walls of a vessel, and refers to the form of such vessel and to the manner of its construction. I have illustrated my invention as embodied in a water-heater such as is used for domestic purposes.

In the drawings, Figure 1 is an elevation, partly broken away, of a water-heater embodying my invention. Fig. 2 is a cross-section in the plane 2 2 of Fig. 1.

In the drawings, 1 designates a water-containing vessel, shown as comprising an approximately cylindric central chamber 11 and a plurality of radially-extending wings or antechambers 12, connected with and of substantially the same length as the chamber 11. At the ends of the vessel 1 are nipples 13 14, which may be interiorly threaded or otherwise adapted to be connected, respectively, with water admission and exhaust pipes.

Surrounding the vessel 1 is a jacket 2, shown as cylindric in cross-section, but which of course may be of any desired form. At the lower and upper ends of the jacket 2 are apertures 21 22 for admitting and emitting heating fluid, which may be from an annular gas-burner (not shown) surrounding the nipple 13.

It is of course understood that the flow of water through the vessel 1 may be either continuous or intermittent. In practice it is usually the latter. When no water is being forced through the vessel 1, upward currents will be formed in the wing-chambers 12 and a return flow will take place downward through the central chamber 11. When there is a positive upward flow through the vessel, this action is modified; but the maximum heating effect will always be had within the wing-chambers 12 by reason of their greater relative surface and by reason also of the narrow neck portion 15, by which they are connected to the central chamber 11.

By forming the wings 12, as shown, gradually tapered in width from their middle points toward each end the vessel may be easily molded and cast in a single piece, a dry-sand core being used in the usual manner. It will also be seen that by making the vessel integral all danger of leakage due to insecure joints is overcome. As shown the outer jacket 2 is also tapered from its middle portion toward its opposite ends. This construction serves to hold the heating medium passing through the jacket in close contact with the winged portions of the inner vessel, with a resulting increased efficiency.

It is clear that my device as it stands may be used to transfer heat from any fluid, either in a fluid or gaseous state, to another and in either direction through the walls of the vessel 1. Thus if cold brine is pumped through the vessel 1 air or any liquid in the jacket 2 will be rapidly chilled, or, conversely, the inner vessel may be used as a conduit for the liquid to be cooled, while the refrigerating-gas may be expanded or the brine forced through the outer jacket 2.

Without enumerating equivalents, what I claim, and desire to secure by Letters Patent, is—

1. An apparatus for the purpose described, comprising an outer casing or jacket, and a liquid vessel arranged within said jacket and having at opposite ends inlet and discharge nipples which project freely through openings in the ends of the jacket, said liquid vessel having a central chamber and a plurality of antechambers integral with and radiating from said central chamber and communicating therewith throughout their length.

2. An apparatus for the purpose described, comprising a heat-conveying vessel consisting of a central chamber and a plurality of radially-extending antechambers, the walls of all said chambers being integral, and said antechambers gradually decreasing in width from their middle points toward their ends, and a jacket surrounding said vessel and decreasing in diameter from its middle portion toward its ends to conform to the antechambers of the inner vessel.

In testimony whereof I have signed this specification in the presence of two subscribing witnesses.

HENRY W. O'DOWD.

Witnesses:
     GEO. L. COOPER,
     GEO. W. JAEKEL.